UNITED STATES PATENT OFFICE.

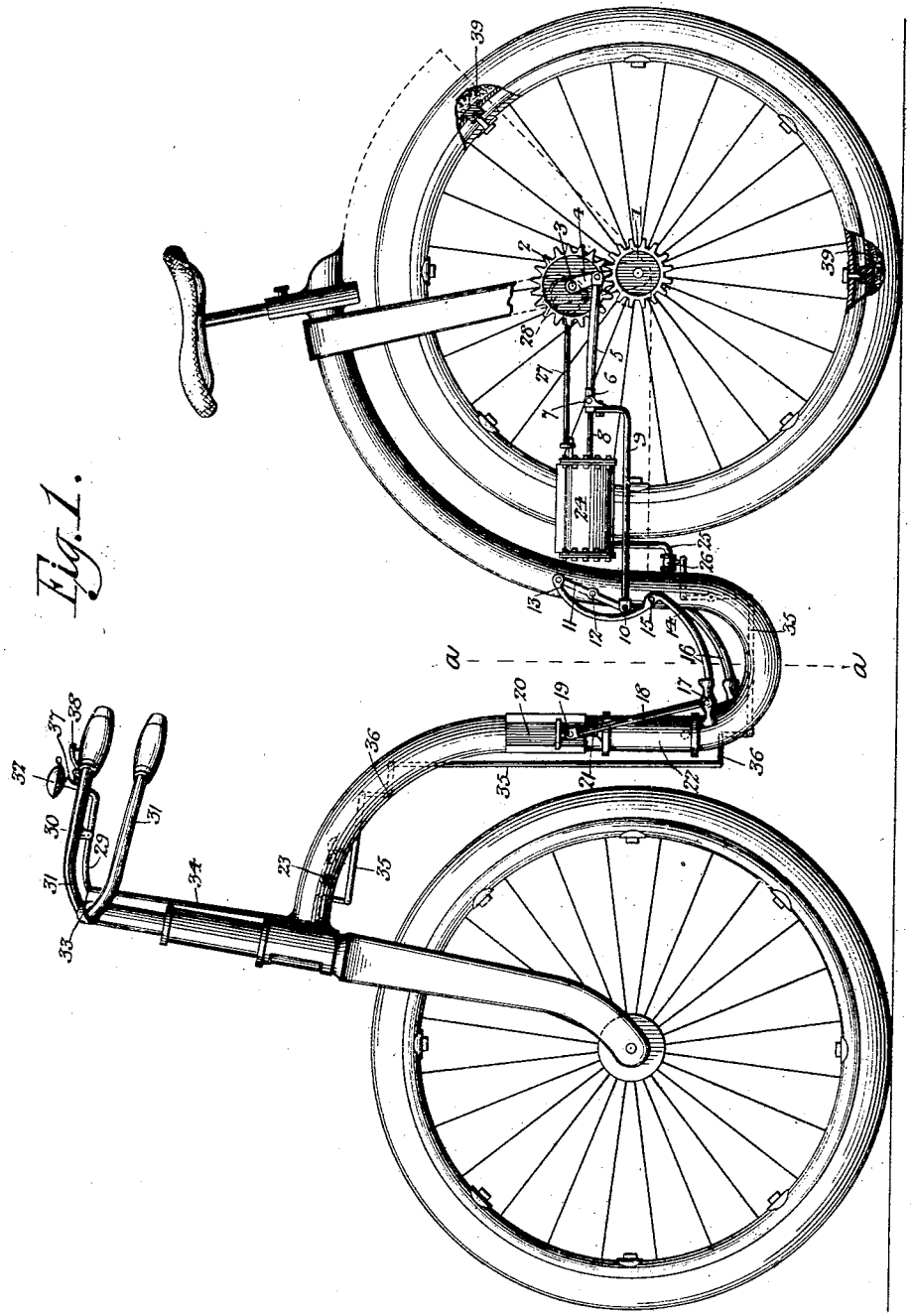

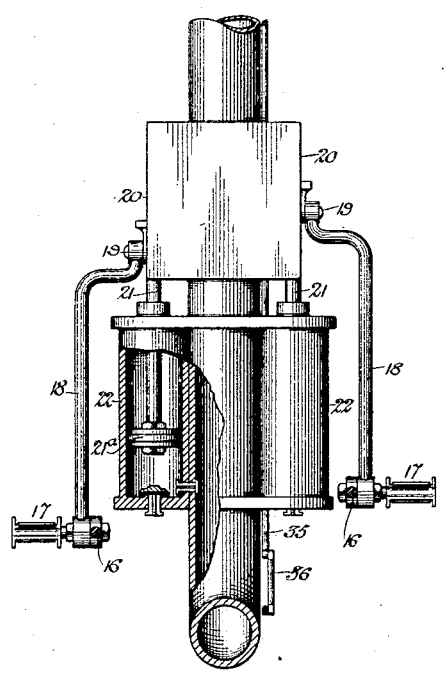

MICHAEL SCHMIDT, OF PHILADELPHIA, PENNSYLVANIA.

DRIVING MECHANISM FOR BICYCLES.

SPECIFICATION forming part of Letters Patent No. 713,350, dated November 11, 1902.

Application filed June 14, 1899. Serial No. 720,591. (No model.)

*To all whom it may concern:*

Be it known that I, MICHAEL SCHMIDT, a citizen of the United States, and a resident of Philadelphia, Pennsylvania, have invented certain new and useful Improvements in Driving Mechanism for Bicycles, of which the following is a specification.

My invention relates to certain new and useful improvements in bicycle driving mechanism and in means for storing power and applying it when desired to aid in the propulsion of the vehicle. The frame of the bicycle constitutes a reservoir for compressed air, such air being stored by the movement of the pedals and appropriate connections when the bicycle is being propelled.

The advantages of my invention will more fully appear hereinafter, reference being had to the accompanying drawings, in which my invention is fully illustrated, and in which—

Figure 1 is a side elevation of a bicycle equipped with my improved driving mechanism; and Fig. 2 is a sectional view, on an enlarged scale, taken on the line $a\ a$, Fig. 1, showing also a portion of one of the cylinders and a portion of the frame broken away to more fully illustrate details of my invention.

The object of my invention is to combine with a special form of driving mechanism auxiliary means for driving a bicycle when extra power is desired at such time, for instance, as when climbing a hill. I prefer to use compressed air to operate such auxiliary driving mechanism, the air being compressed during the ordinary running of the bicycle and stored in the hollow frame of the same.

Secured to the hub of the rear wheel is a pinion 1, which meshes with a pinion 2, carried by a stud or spindle 3, journaled in any suitable manner in the frame of the bicycle. A crank 4 is mounted on the end of the stud or spindle 3, and to the end of this crank the driving-rod 5 is pivotally attached, the other end of said rod 5 being connected at 6 to the cross-head 7, carried by the piston-rod 8. A cranked arm 9 is also connected to the cross-head 7, the other end of which arm is connected at 10 to one end of a two-armed lever 11, said lever being pivoted at 12 to the frame of the bicycle. To the other arm of this lever 11 the arm 13 of a two-armed lever 14 is attached, said lever being pivoted at 15 to the frame of the machine. The other arm 16 of this lever 14 is curved in the opposite direction and is connected at its end to the pedal 17. Each pedal 17 is connected by means of a rod 18 to a cross-head 19, working in a slide 20, said slides being arranged on opposite sides of the frame, above the lower bend of the same. Each cross-head has attached to it a piston-rod 21, and each piston-rod carries a piston $21^a$, arranged within a cylinder 22, these cylinders being secured to the frame below the slide 20 and in proper communication with the frame of the bicycle.

The frame of my improved bicycle is substantially U-shaped, as shown in the accompanying drawings, and is hollow, so as to serve as a receptacle for the compressed air, as will hereinafter appear. Suitable means are provided for the admission and discharge of the compressed air. (Indicated by dotted lines in the drawings and set forth hereinafter.)

It will be apparent that as the bicycle is propelled by means of the pedals air will be stored in the hollow frame of the same. The air may be withdrawn from this reservoir to assist in the propulsion of the bicycle in the following manner: The frame-reservoir is provided with a suitable relief-valve 23, (indicated by dotted lines in the drawings,) and connection is made between said frame-reservoir and the cylinder 24 by means of a pipe 25. The outlet from the frame-reservoir through this pipe into the cylinder is controlled by a valve 26, which is controlled by the rider, as will be described shortly.

Mounted above the cylinder 24 is an ordinary valve-box, provided with the usual slide-valve and having a valve-rod 27 connected to an eccentric 28, mounted on the stud or spindle 3. The eccentric 28 being turned as the spindle 3 is rotated, the valve-rod is carried back and forth, and the valve operated thereby is moved into different positions necessary to provide for the inlet and exhaust of the motive fluid to and from the cylinder 24 to act upon the piston located therein when the bicycle is driven by the auxiliary mechanism.

The means for controlling the valve 26 are as follows: A lever 29 is pivotally mounted at 30 on the handle-bar 31 of the bicycle, with one end bent upward and provided with a knob or handle 32 within convenient reach of the hand of the rider. To the other end 33 of this lever a rod 34 is pivotally connected, which rod by means of suitable links and bell-crank levers 35 and 36 is connected to the valve 26, so that when the lever 29 is operated the said valve will be opened to admit air to the cylinder 24. In order to hold the lever 29 in such position that the valve 26 may be kept open to admit air to the cylinder 24, I provide the upturned portion of said lever with a lug or catch 37, which is adapted to automatically engage a spring catch or trigger 38, pivoted on the handle-bar 31, as shown in the drawings.

The operation of my improved driving mechanism will be readily understood from the foregoing description when taken in connection with the annexed drawings, and a detailed description thereof does not seem necessary.

During ordinary riding the reservoir in the frame is charged with air, and when it is desired to run solely by means of the stored power or to utilize the same in assisting the propulsion of the bicycle—say in going up a hill—the lever 29 is depressed so as to open the valve 26 and admit air to the cylinder 24, which will operate the piston and piston-rod 27 and through the eccentric and its connection apply power to the rear wheel of the bicycle, as will be readily understood.

Modifications in detail may be made without departing from the spirit of the invention or sacrificing any of its advantages.

Any desired form of tires may be employed with my improved bicycle; but I prefer to use a tire of the cushion type, in which the tube is filled with feathers, hair, or the like, as shown at 39 in the accompanying drawings, where the tube is broken away to better disclose the filling.

Having thus described my invention, I claim and desire to secure by Letters Patent—

1. The combination in a bicycle, of the frame, pedals carried by said frame and adapted to be operated by the feet of the rider, a pinion carried by the rear wheel of the bicycle, a driving-pinion carried by the rear fork of the frame above, and in constant engagement with the wheel-pinion, a crank carried by the said driving-pinion, a two-armed lever carried by the frame of the bicycle, a connection between said crank and one arm of said lever, connecting-links between the opposite end of said lever and one of the driving-pedals, an engine, consisting of a cylinder, a valve and valve-chest mounted on the frame, a piston in said cylinder, said piston being attached to the connection between the two-armed lever and the crank and serving as an auxiliary driving means for said crank and pinion, the frame of the bicycle being hollow and serving as a reservoir for motive fluid to drive the engine, air-compressors mounted on the front portion of the frame of the bicycle, links connecting said air-compressors with the pedals whereby air may be stored in the frame as the pedals are moved up and down, a valved connection between the rear portion of the frame-reservoir and the engine-cylinder for the passage of the motive fluid to the engine, and means operated from the handle-bar for controlling said valve, substantially as described.

2. The combination in a bicycle, of the frame, driving-pedals carried by the frame and adapted to be operated by the feet of the rider, a pinion carried by the rear wheel of the bicycle, a driving-pinion carried by the rear fork of the frame, above, and in constant engagement with the wheel-pinion, a two-armed lever pivoted to the frame of the bicycle, a driving connection between one end of said lever and the crank, connecting-links secured to the opposite end of said lever and to the driving-pedal, a single-cylinder compressed-air engine mounted on the frame of the bicycle, the piston-rod of said engine being secured at its outer end to the driving connection between the crank and the two-armed lever, said engine serving as an auxiliary driving means for the bicycle, the frame of the bicycle serving as a reservoir for the motive fluid for driving the engine, air-compressors mounted on the front portion of the frame of the bicycle, pistons adapted to said compressors, links connecting said pistons and the pedals whereby air may be stored in the frame as the pedals are moved up and down, a valved connection between the rear portion of the frame and the cylinder of the engine for the passage of motive fluid whereby the bicycle may be driven independently of the pedals, a valve controlling the movements of the engine-piston and mounted directly on the engine-cylinder, and an eccentric mounted on the spindle of the driving-pinion and controlling said valve, the parts of said mechanism being operated when the bicycle is being driven by the pedals, but adapted and serving to drive the bicycle when the foot-power is withdrawn, substantially as described.

3. The combination with the frame of the bicycle, of the air-compressors, pistons carried thereby, pedals for driving the bicycle by foot-power, links connecting said pedals with the pistons of the compressors whereby air may be stored simultaneously in the frame of the bicycle as the said bicycle is being propelled by foot-power, driving means for the bicycle including pinions 1 and 2 journaled in suitable bearings and so arranged as to be in constant engagement with each other, the pinion 1 being carried by the rear wheel of the bicycle, and the pinion 2 mounted on the frame above said pinion 1, means adapted to be operated by the compressed air for aiding in the propulsion of the bicycle, said means including a cylinder, a piston therein, a crank carried by the driving-pinion 2, a connecting-rod between the piston of the engine and said crank, a valve between the rear portion of the frame and the engine-cylinder, a lever carried by the handle-bar of the bicycle, bell-crank levers mounted on the frame of the bicycle and connected together by links and to the lever carried by the handle-bar, and means for locking said lever when the valve is in position to provide communication between the reservoir formed by the frame and the engine, substantially as described.

In testimony whereof I affix my signature in presence of two witnesses.

MICHAEL SCHMIDT.

Witnesses:
FRANCIS D. PASTORIUS,
B. D. ARCHER.